United States Patent [19]

Voisinet et al.

[11] Patent Number: 4,747,240

[45] Date of Patent: May 31, 1988

[54] ENCAPSULATED PCM AGGREGATE

[75] Inventors: Walter E. Voisinet, Colden, N.Y.; Deall Daymon, Richardson, Tex.; John A. Slyh, Lansdale, Pa.

[73] Assignee: National Gypsum Company, Dallas, Tex.

[21] Appl. No.: 290,617

[22] Filed: Aug. 6, 1981

[51] Int. Cl.[4] ............................ F24D 5/10; F04B 1/76
[52] U.S. Cl. .................................... 52/173 R; 106/90; 106/96; 165/902; 252/70
[58] Field of Search ...................... 52/173 R, 389, 481, 52/415, 232, 446; 126/400; 165/DIG. 4, 104.17, 104.21; 252/53, 70; 106/90, 96

[56] References Cited

U.S. PATENT DOCUMENTS

| | | | |
|---|---|---|---|
| 2,366,156 | 1/1945 | Simonson | 52/415 |
| 3,319,392 | 5/1967 | Fitzgerald | 52/389 |
| 3,921,346 | 11/1975 | Sauer et al. | 52/481 |
| 3,936,311 | 2/1976 | Kirst et al. | 106/90 |
| 3,960,205 | 6/1976 | Laing | 126/270 |
| 4,003,426 | 1/1977 | Best et al. | 52/173 R |
| 4,036,301 | 7/1977 | Powers et al. | 106/96 |
| 4,042,012 | 8/1977 | Perry et al. | 126/400 |
| 4,058,406 | 11/1977 | Raponi | 106/90 |
| 4,082,109 | 4/1978 | Sun et al. | 165/104.21 |
| 4,131,158 | 12/1978 | Abhat et al. | 126/400 |
| 4,178,727 | 12/1979 | Prusinski | 52/173 R |
| 4,207,115 | 6/1980 | Boehme et al. | 106/96 |
| 4,277,357 | 7/1981 | Boardman | 252/70 |
| 4,316,826 | 2/1982 | Laquerbe et al. | 106/96 |
| 4,349,446 | 9/1982 | Marks | 252/70 |
| 4,367,788 | 1/1983 | Cordon | 165/DIG. 4 |

OTHER PUBLICATIONS

J. F. Martin et al, "Thermal Energy Storage for Building Heating and Cooling Applications", Oak Ridge, Tenn., Jun. 1980.

G. A. Lane et al, "Macro-Encapsulation of Heat Storage Phase-Change Materials for Use in Residential Buildings", Dow Chem. Co., Midland, Mich., Nov. 1978.

Primary Examiner—David A. Scherbel
Assistant Examiner—Richard E. Chilcot, Jr.
Attorney, Agent, or Firm—Robert F. Hause

[57] ABSTRACT

Phase change materials (PCM's) having a phase change at about 10° C. to 30° C. are incorporated like a fine aggregate into building materials.

14 Claims, No Drawings

ENCAPSULATED PCM AGGREGATE

This invention relates to energy storage in building structures and particularly to the incorporation of small units of a PCM as an otherwise inert aggregate in coatings or board or block type building materials.

There is a need for more energy efficient buildings and preferably in forms which do not differ markedly from the form of homes and buildings that the public is accustomed to.

The present invention provides for a modification of existing forms of building materials to permit their use in the ways they have previously been used, i.e. standard construction methods, while providing the ability of these building materials to store heat energy, for example the energy of the sun during the day, which energy can subsequently be released, as heat, during the night.

It is an object of the present invention to provide more energy efficient building materials.

It is a further object to provide a novel aggregate for use in building materials, having a relatively permanent ability to store and subsequently release large quantities of thermal energy.

It is a still further object to provide a novel combination of building materials and an aggregate contained therein providing improved passive solar heating and cooling.

EXAMPLE I

According to the present invention a wall or ceiling coating is prepared in accordance with the following formulation:

| | |
|---|---|
| Polyvinyl Acetate (60% solids) | 10 lbs. |
| Titanium Dioxide Pigment | 1 lb. |
| Calcium Carbonate Filler | 74 lbs. |
| Mica | 3.5 lbs. |
| Montmorillonite Clay | 10 lbs. |
| Chopped Cotton Fiber | 5 lbs. |
| Microencapsulated PCM | 3 cu. ft. |

These ingredients are blended together and, upon addition of water thereto, provide an energy storing textured wall spray.

It should be realized in the above Example and all subsequent examples that the amount of PCM which is to be included in any product, in accordance with the invention, may be varied from a minimum amount determined by the minimum amount of heat storage that may be desired per unit area of product up to a maximum beyond which the inclusion of more PCM results in a loss of integrity of the product. Theoretically, if the PCM elements are uniform diameter spheres, the volumetric maximum proportion would be about 50%, whereas with nonuniform elements greater volumetric proportions could be incorporated, up to about 75%.

EXAMPLE II

A thin coat plaster or a regular thickness plaster can be prepared by addition of water to a powder and capsules compound formulated as follows:

| | |
|---|---|
| Calcined Gypsum Plaster | 100 lbs. |
| Retarder | as needed for required set |
| Microencapsulated PCM | 2 cu. ft. |

This formulation, when combined with sufficient water to provide a working consistency, can be applied to walls and ceilings as a veneer, or thin coat, plaster in a thickness of about ⅛"-¼" or as a regular thickness plaster wall in a thickness of about ⅜".

EXAMPLE III

Also, in accordance with the invention, microencapsulated PCM's may be admixed with any commercial finely powdered mortar for admixture with water and used as a bedding about 1" thick over wood floors for application of floor tile thereover. In this example, microencapsulated PCM's are admixed with the mortar in a ratio by volume of 15% to 50% of the total mixture, in order to provide heat storage capacities of 60 to 150 BTU's per square foot, respectively. As will be noted from Examples I, II and III, the matrix of the cementitious building material of the invention is composed primarily of an inorganic compound, and is of a basically porous structure, as is well known of wall textures, wall plaster and mortar.

Considering now the nature of the encapsulated PCM, the encapsulation contemplated is that described in Chemtech, Vol. 4, October 1974 at pages 623–626, wherein both microencapsulation and somewhat larger encapsulation are both described. The Chemtech description of encapsulation is accordingly included herein by reference.

In general, PCM's ideally have high latent heats of fusion at the desired temperature, exhibit reversible solid-to-liquid transition, and have low vapor pressure and volume change during phase transition. Although incongruent melting causes reversibility problems with bulk PCM because of phase separation, the problem might be minimized in capsules, as the phases would be in much closer proximity. High thermal conductivity is also desirable, but becomes non-critical when the PCM is finely divided, as in the encapsulated state, and has a high surface area in contact with a matrix material of high thermal conductivity.

The PCM's to be used in accordance with the present invention have a phase transition temperature of about 20° C.; however this could vary widely with the particular use to which the end product, and the building containing it, are to be put. Transition temperatures of from about 10° C. to about 30° C. may have value in capsules in building products.

Of particular importance, the present invention permits use of, and preferably employs, PCM's having phase change temperatures which are approximately equal to the average human comfort temperature desired within the building, normally 20°-22° C. in a home. This equating of PCM with human comfort temperature is made practical in the preferred application by the novel distribution of the PCM throughout vast interior building surfaces with thermally conductive materials. This minimizes the total thermal resistance between the PCM and its ambient air and its surrounding surfaces, thereby permitting it both to store and to release heat by natural convection and by heat radiation, utilizing very small and not uncomfortable temperature differences.

Two PCM's suitable for encapsulation are polyethylene glycol and a low melting paraffin, such as heptadecane. Polyethylene glycol is available in widely ranging molecular weights and one with a molecular weight of about 600 has a melting temperature in the human comfort zone, and is thus advantageous in accordance with the invention, when encapsulated.

The shell material of the capsule may be a relatively high melt paraffin wax, hydrocarbon resins and polyethylene or mixtures thereof. A reasonable degree of shell flexibility will be needed and is provided by use of shell plasticizers.

Capsules may also be made containing a sodium sulfate decahydrate and sodium chloride mixture, using a fill material as follows:

|  | Parts by Wt. |
| --- | --- |
| $Na_2SO_4.10\ H_2O$ | 80.4 |
| Na Cl | 8.9 |
| $Na_2B_4O_7.10\ H_2O$ | 2.7 |
| $H_2O$ | 7.8 |
| Hydroxyethylcellulose | 0.2 |

This fill material may be encapsulated in a seamless generally spherical shell formed from a hot melt resin having an average diameter of about 1100 microns. The ratio of fill material to shell material is about 4:1. The shell may consist of the following:

|  | Parts by Wt. |
| --- | --- |
| Paraffin Wax | 45 |
| Thermoplastic Terpene Resin | 45 |
| Polyethylene | 10 |

Another fill formulation is as follows:

|  | Parts by Wt. |
| --- | --- |
| $CaCl_2.6\ H_2O$ | 84.8 |
| $Mg\ Cl_2.6\ H_2O$ | 15.0 |
| $Ba\ Cl_2.2\ H_2O$ | 0.2 |

This fill material may be encapsulated in a similar shell having an average diameter of about 800 microns, and a fill to shell ratio of about 1:1.

Although microencapsulation of materials is possible in sizes as low as 2 microns, the preferred range of capsule sizes in accordance with the invention is about 500 to 3000 microns. Capsules below 500 microns can be used but if fill ratios are kept high enough to obtain good economics, the wall thicknesses of the capsules must be reduced, resulting in increased difficulty of admixing with different materials. Capsules larger than 3000 microns are contemplated as possibly having advantages in a building board.

Although encapsulation of PCM's is the preferred form for preparing the PCM for incorporation into the cementitious building products described above, it is further contemplated that fine particles of non-encapsulated PCM which have been form stabilized can be substituted therefor. Form stabilized PCM's have been prepared in fine particle size which retain their shape as they repeatedly go through freeze-thaw cycles at temperatures of between about 10° C. to 30° C.

A preferred form of final structure, in accordance with the invention, is a building for human habitation, for example a home having 1500 square feet of floor space. Typically this home will have 5000 square feet of wall and ceiling surface of which over 4000 square feet surround living space, and the balance is in closets.

If these 4,000 square feet are all coated with plaster containing encapsulated PCM, as described in Example II, then up to 70 BTU's of thermal storage per square foot can be provided by coating thicknesses of up to ½". Thus, the daily heat storage capacity of the residence will be enhanced by up to 280,000 BTU's, or by about 300% more than its original intrinsic thermal storage without any enhancement. This is the amount of heat that will be absorbed during an 8-hour period and released during a 16-hour period when ambient temperatures within the house are 6° F. above the PCM melting point during the 8-hour period and 4° F. below the melting point during the 16-hour period. With a PCM having a 69° F. melting point, the house will need to have a day-night ambient temperature swing of about 75° F. to 65° F.—a range which is very acceptable. For lesser degrees of heat storage enhancement, which are more typical for most passive solar heated residences, a proportional reduction in both the PCM coating thickness and in the daily temperature swing will be required in the above example. Where thermal storage enhancement of 35 BTU or less per square foot (and hence a coating thickness of ¼" or less) is required, then either a textured wall spray, as described in Example I, or a thin coat plaster, as described in Example II, may be used.

This absorption of heat during the 8-hour period will function to provide a cooling effect during the warmer period, in addition to collecting the heat which will provide the wraming effect during the cooler period.

Having completed a detailed description of the preferred embodiments of our invention so that those skilled in the art may practice the same, we contemplate that variations may be made without departing from the essence of the invention.

We claim:

1. An inorganic cementitious interior building material comprising primarily inorganic material and including a cementitious ingredient for binding together all of the elements of said building material and, dispersed therewithin, a substantial and up to about 75% by volume portion of small particles of a phase change material having a substantial latent heat of fusion at a temperature in the range of about 10° C. to 30° C., said phase change material being in a form which retains its particle integrity during repeated cycles of melting and freezing.

2. A cementitious building material as defined in claim 1 wherein said particles are capsules consisting of a phase change material sealed within a shell.

3. A cementitious building material as defined in claim 2 wherein said capsules are approximately spherical in shape and of a diameter of about 500 to about 3000 microns.

4. A cementitious building material as defined in claim 1 wherein said particles are non-encapsulated phase change materials which have been form stabilized.

5. A cementitious building material as defined in claim 1 wherein said building material is a coating for a building surface.

6. A cementitious building material as defined in claim 1 wherein said building material is a board for forming building walls.

7. A cementitious building material as defined in claim 1 wherein said building material is a tile floor underlay mortar.

8. A cementitious building material as defined in claim 1 wherein said building material is an interior surface forming material suitable for use on substantially all wall and ceiling surfaces and said phase change material has a phase change temperature of about 20°-22° C.

9. An interior building material comprising an inorganic cementitious binder, filler materials and a substantial and up to about 75% by volume portion of small capsules having sealed therein a phase change material having a substantial latent heat of fusion at a temperature in the range of about 10° C. to 30° C.

10. A building material as defined in claim 9 wherein said phase change material is a polyethylene glycol.

11. A building material as defined in claim 9 wherein said phase change material is a low melting paraffin.

12. A building material as defined in claim 9 wherein said phase change material is a hydrated salt of the class consisting of sodium and calcium.

13. A building comprising a plurality of rooms for human occupancy, each room being formed by a floor, a ceiling and a plurality of walls, a major portion of said ceilings and walls having a surface formed from a building material as defined in claim 1.

14. A building comprising a plurality of rooms for human occupancy, each room being formed by a floor, a ceiling and a plurality of walls, a major portion of said ceilings and walls having a surface formed from a building material as defined in claim 6.

* * * * *